(12) United States Patent
Talstra et al.

(10) Patent No.: US 9,247,024 B2
(45) Date of Patent: Jan. 26, 2016

(54) CONTROLLED ACTIVATION OF FUNCTION

(75) Inventors: Johan Cornelis Talstra, Eindhoven (NL); Pim Theo Tuyls, Eindhoven (NL); Daniel Willem Elisabeth Schobben, Eindhoven (NL)

(73) Assignee: INTRINSIC ID B.V., Eindhoven (NL)

( * ) Notice: Subject to any disclaimer, the term of this patent is extended or adjusted under 35 U.S.C. 154(b) by 618 days.

(21) Appl. No.: 12/595,671

(22) PCT Filed: Apr. 4, 2008

(86) PCT No.: PCT/IB2008/051279
§ 371 (c)(1),
(2), (4) Date: Jan. 15, 2010

(87) PCT Pub. No.: WO2008/125999
PCT Pub. Date: Oct. 23, 2008

(65) Prior Publication Data
US 2010/0146261 A1    Jun. 10, 2010

(30) Foreign Application Priority Data
Apr. 12, 2007   (EP) .................................... 07106038

(51) Int. Cl.
| H04L 29/06 | (2006.01) |
| H04L 29/08 | (2006.01) |
| G06F 21/10 | (2013.01) |
| H04L 9/32  | (2006.01) |

(52) U.S. Cl.
CPC ............... *H04L 67/34* (2013.01); *G06F 21/10* (2013.01); *H04L 9/321* (2013.01); *H04L 9/3278* (2013.01); *H04L 63/08* (2013.01); *H04L 63/10* (2013.01); *H04L 67/12* (2013.01); *H04L 2209/60* (2013.01); *H04L 2209/80* (2013.01)

(58) Field of Classification Search
USPC .......................................................... 713/155
See application file for complete search history.

(56) References Cited

U.S. PATENT DOCUMENTS

| 7,564,345 | B2 * | 7/2009 | Devadas et al. ............. 340/539.1 |
| 8,032,760 | B2 * | 10/2011 | Tuyls et al. .................... 713/186 |
| 8,281,148 | B2 * | 10/2012 | Tuyls et al. .................... 713/185 |
| 2007/0044139 | A1 * | 2/2007 | Tuyls et al. ........................ 726/2 |

(Continued)

FOREIGN PATENT DOCUMENTS

| WO | WO 2005/122467 | 12/2005 |
| WO | WO 2006/053304 | 5/2006 |
| WO | 2006/071380 | 7/2006 |

OTHER PUBLICATIONS

International Search Report for PCT/IB2008/051279, mailed Oct. 1, 2008.

(Continued)

*Primary Examiner* — Esther B Henderson
(74) *Attorney, Agent, or Firm* — Nixon & Vanderhye P.C.

(57) ABSTRACT

A method of and system (110) for controlled activation of at least one function in a product or component at a remote location, which activation requires a correct activation data item to be available in the product or component. The method comprises receiving one or more noisy outputs of an unclonable element associated with the component from the remote location, and providing helper data to the remote location, which helper data transforms the one or more noisy outputs to a single value which corresponds to the correct activation data item.

23 Claims, 4 Drawing Sheets

(56) References Cited

U.S. PATENT DOCUMENTS

2007/0180261 A1* 8/2007 Akkermans et al. .......... 713/186
2008/0112596 A1* 5/2008 Rhoads et al. ................ 382/115

OTHER PUBLICATIONS

E. Simpson et al., "Offline HW/SW Authentication for Reconfigurable Platforms", Workshop on Cryptographic Harware and Embedded Systems, [online], Oct. 2006, pp. 311-323, XP002496277.

Gassend, "Physical Random Functions Thesis", Thesis at the Massachusetts Institute of Technology, Feb. 2003, XP002316843.

Pim Tuyls et al., "RFID-Tags for Anti-counterfeiting", Topics in Cryptology — CT-RSA 2006 Lecture Notes Computer Science;, Springer, Berlin, DE, vol. 3860, Jan. 1, 2005, pp. 115-131, XP019026798.

Jiawei Huang, "IC Activation and User Authentication for Security-Sensitive Systems", EEE International Workshop on Hardware-Oriented Security and Trust, Jun. 9, 2008, Anaheim, CA, USA, XP002496436.

English language translation of Office Action in Korean Application No. 10-2009-7023562, Mar. 2, 2014.

Korean language Office Action in Korean Application No. 10-2009-7023562, Mar. 2, 2014.

\* cited by examiner

CONTROLLED ACTIVATION OF FUNCTION

This application is the U.S. national phase of International Application No. PCT/IB2008/051279, filed 4 Apr. 2008, which designated the U.S. and claims priority to European Application No. 07106038.8, filed 12 Apr. 2007 the entire contents of each of which are hereby incorporated by reference.

FIELD OF THE INVENTION

The invention relates to controlled activation of at least one function in a product or a component such as a chip, FPGA or software module.

BACKGROUND OF THE INVENTION

Products such as televisions, mobile phones, DVD players, computers, laptops and other electronics, but also computer programs for such products, implement a large variety of features or functions. These functions are usually called intellectual property (IP) blocks and are provided by IP providers, one or more different companies or other entities. The IP blocks can be provided e.g. as part of chip designs, bitstreams for field programmable gate arrays (FPGAs) or software components.

Because those IP blocks are often made available on a per-product royalty basis, it is desirable to control activation of these IP blocks. That is, an IP block should not be in operation in a product unless this fact has been reported to—and optionally authorized by—the IP provider.

Known solutions in this field include the reporting of a unique identifier associated with the product or IP block to a remote server, whereupon the server returns an authorization code associated with the unique identifier.

Preferably the authorization code is designed in such a way that only with a correct authorization code, the IP block's functionality can be activated. Activation in this context is often implemented by comparing the authorization code with a predefined code available to the IP block. If the codes do not match, the function is not enabled. The authorization code can also be used as a key to unlock or decrypt all or part of the IP block, for example as a decryption key to decrypt a bitstream to be loaded onto an FPGA to cause the FPGA to provide the function in question.

For example each Xilinx Spartan™-3A platform is provided with a unique serial number, referred to as "Device DNA". The configuration data comprises an authentication value that corresponds to the Device DNA of one particular specimen. Each specimen is provided with a module that verifies whether the Device DNA of the platform matches the authentication value, and enables all or part of the module's functionality only if there is such a match, i.e. if the right configuration data is present.

The authorization code can also be used as a key necessary to process input provided to the IP block, for example as a decryption key for audiovisual content to be decrypted by the IP block or to authenticate the product at a remote server with which data is to be exchanged.

WO 2006/053304, hereby incorporated by reference, discloses a method of determining a key from a physically unclonable function (PUF) provided on such a device. This involves applying error control data to the response from the PUF. The key can then be used e.g. to enable the device to decrypt data such as encrypted audiovisual content, or to authenticate itself to other parties.

Another approach to obtain a key from a PUF is disclosed in B. Skoric, P. Tuyls and W. Ophey, "Robust key extraction from Physical Unclonable Functions", Applied Cryptography and Network Security ACNS 2005, LNCS 3531, pp. 407-422 (2005). A key is derived from a PUF response by applying certain helper data to the raw response.

A problem in this field is that of cloning. An IP block or even an entire device can be copied in its entirety, i.e. including the unique associated identifier. The IP block in the clone now can be activated using the same authorization code as the IP block in the original. The clone thus does not need to be reported to the remote server, causing under-reporting of activated IP blocks and associated loss of royalties.

To protect against cloning, various solutions are available that provide supposedly unclonable identifiers. For example WO 2006/071380, hereby incorporated by reference, discloses a field configurable device, such as an FPGA, which supports secure field configuration without using a volatile or non-volatile storage for cryptographic keys on the device. This device is provided with a physically unclonable function or PUF that, given a challenge, provides an output which is unique to each particular specimen of the device. However a particular PUF cannot be cloned or reproduced on another device. To ensure that the same output is produced, certain error correcting data needs to be applied to a certain response. This makes it possible to derive the configuration data from the output of a PUF. Only one particular specimen can then successfully reconstruct the configuration data.

Generally speaking these approaches provide protection against unauthorized copying by tying the IP block to a particular specimen of a product by means of a PUF-derived unique item. A copy of the IP block will not operate on a different specimen because the PUF on that specimen will differ from the PUF on the original specimen, which will cause the reconstruction of the configuration data to fail. This may lead to a wrong authentication value or key.

These solutions have in common that, at some point, the identifier needs to be read out and supplied to the remote server to receive the corresponding authorization code. During that process, both the identifier and the authorization code can be observed and recorded. A clone can then still be produced, for example by providing the clone with a simple chip that reproduces the observed identifier. This chip then replaces the memory or other item that originally provides the identifier.

Measures can be taken to hinder the eavesdropping on the activation process, but those are complex and may be beyond the capabilities of many devices. The abovementioned WO 2006/071380 uses public-key encryption to securely transfer the identifier, or recommends the use of a separate enrolment procedure in a trusted environment.

Further, the inventors have realized that the above implicitly assumes a complete trust in the entity that programs or loads this helper data into the component or product in question. In many cases this entity will be a third-party manufacturer that produces the products or intermediary components. This entity should report to the IP provider(s) which and how many products or components he has manufactured, so that the right royalty for the IP blocks he has used can be charged.

However a manufacturer can simply manufacture more using the very same facilities as used for the 'official' products. These extra products of course have their own unique PUF, but the manufacturer is able to provide them with the right helper data, which will cause the IP blocks that rely on the PUF to function as if they were installed on the originals. The manufacturer has to know how to provide helper data otherwise he cannot produce the official products. This makes it possible for a manufacturer to pass off these extra, unauthorized products as originals. It is now also possible to under-report the number of products manufactured, which means the IP provider receives lower royalties than to which he is entitled.

Thus there is a need for a method of controlled activation of a function that prevents the activation of cloned devices.

SUMMARY OF THE INVENTION

The invention provides a method of controlled activation of at least one function in a product or component at a remote location, which activation requires a correct activation data item to be available in the product or component, characterized by receiving one or more noisy outputs of an unclonable element associated with the component from the remote location, and providing helper data to the remote location, which helper data transforms the one or more noisy outputs to a single value which corresponds to the correct activation data item.

Unclonable components with noisy outputs are known by themselves. One name for such components is Physical Random (Unclonable) Functions or PUFs. So-called helper data provides redundancy to transform these noisy responses to a single value which can be chosen arbitrarily. That is, the same noisy response can be transformed to different single values by the appropriate choice of helper data.

The invention proposes to compute this helper data at a location that is remote from where the product or component to be activated is situated. To activate the function, a correct activation item must be available. The helper data transforms the one or more noisy outputs to a single value which corresponds to the correct activation data item. The helper data is transmitted to the remote location where the product or component resides. This allows the product or component to derive the correct activation data item.

Surprisingly this use prevents the activation of cloned devices. The unclonable component by definition cannot be cloned. A second component cannot be activated by using the helper data received for a first response, since that helper data is uniquely tied to the noisy response produced by the PUF for the first component (and turns that response into a unique and robust identifier). Applying that helper data to a noisy response produced by the PUF for the second component will not result in the correct activation data item. Because of the necessity to involve a remote entity for activation, as provided by the invention, the activation process cannot be bypassed.

Note that an 'activation data item' may comprise multiple bits or bytes of data. Similarly the 'single value' above will typically be multiple bits or bytes of data.

The abovementioned WO 2006/071380 discloses a device which is provided with a physically unclonable function or PUF that, given a challenge, provides an output which is unique to each particular specimen of the device. To ensure the same output is produced, certain error correcting data needs to be applied to a certain response. The output is then delivered to a remote server, which returns an authorization code that has been blinded using the output, for example as the result of an XOR operation that combines the output and the authorization code.

A key difference with the present invention is that in this system the output as sent to the server has been stabilized and thus is not noisy. This requires that the device must measure and stabilize the response during enrolment, which takes time that may not be available, especially when enrolment takes place during production. The invention in contrast moves the stabilization, the computation of helper data, to the server side.

Moreover the approach from WO 2006/071380 needs two steps: first, stabilize the noisy response, and second, use the stabilized output to securely deliver an authorization code. The present invention does both in one, integrated step. The helper data is computed such that it transforms the one or more noisy outputs to a single value which corresponds to the correct activation data item. There is thus a relation between the helper data and the activation code, which relation is not there in the WO 2006/071380 approach.

This relation among other things reduces the amount of data that needs to be stored. The present invention only needs to store the helper data. Applying the helper data to the noisy response produces the activation data item. The WO 2006/071380 approach needs to store both the error correcting data (to stabilize the noisy response) and the blinded authorization code.

An embodiment of the present invention comprises transmitting an authentication element for establishing authenticity of the helper data to the remote location. This ensures no third party can provide helper data to enable the functionality of the component. The component should in this embodiment be configured to only employ the helper data if the authenticity of the helper data can be verified using this authentication element. For example, the authentication element can be a separate digital signature or message authentication code. Alternatively the helper data can be encrypted with a key, e.g. by using an operation such as XOR or public key encryption.

In one variation of this embodiment the authentication element is obtained by transmitting the helper data to a third party and receiving the authentication element in response from the third party. This embodiment ensures the party that enables the functionality cannot supply helper data without the third party, typically the provider of the component in question, knowing about it. Two possible implementation options are a black box at the trusted party and a remote server at the IP provider contacted in real-time by the trusted party.

In another variation the helper data is encrypted before transmitting it to the third party. By encrypting the helper data, it is ensured that the third party does not gain access to the helper data itself. This prevents him from learning how to construct helper data for particular responses. Then a blind signature is preferably used to sign the helper data.

A further embodiment comprises receiving a remote authentication element from the remote location, and only providing the helper data if the helper data can be successfully authenticated using the remote authentication element. This helps to protect the communication against forgeries and attempts to overload the system by sending randomly chosen data.

In a further embodiment the helper data is transmitted to a second remote location different from the remote location from which the one or more responses have been received. In this embodiment it is more difficult to circumvent the system. Now two parties have to cooperate.

In a further embodiment the received one or more noisy outputs are compared against plural previously received noisy outputs, and the helper data is provided only if the one or more noisy outputs have not been received previously. This provides security against replay attacks where the same noisy outputs are provided multiple times. The comparison may be a lossy comparison, i.e. the received noisy outputs may differ a small amount with the previously received noisy outputs. If the match is deemed to be "good enough" (e.g. 90% of the bits in the outputs correspond), the comparison is considered positive.

The invention further provides a system that implements the method.

BRIEF DESCRIPTION OF THE FIGURES

These and other aspects of the invention will be apparent from and elucidated with reference to the illustrative embodiments shown in the drawings, in which.

Throughout the figures, same reference numerals indicate similar or corresponding features. Some of the features indicated in the drawings are typically implemented in software, and as such represent software entities, such as software modules or objects.

DETAILED DESCRIPTION OF PREFERRED EMBODIMENTS

Figure 1:
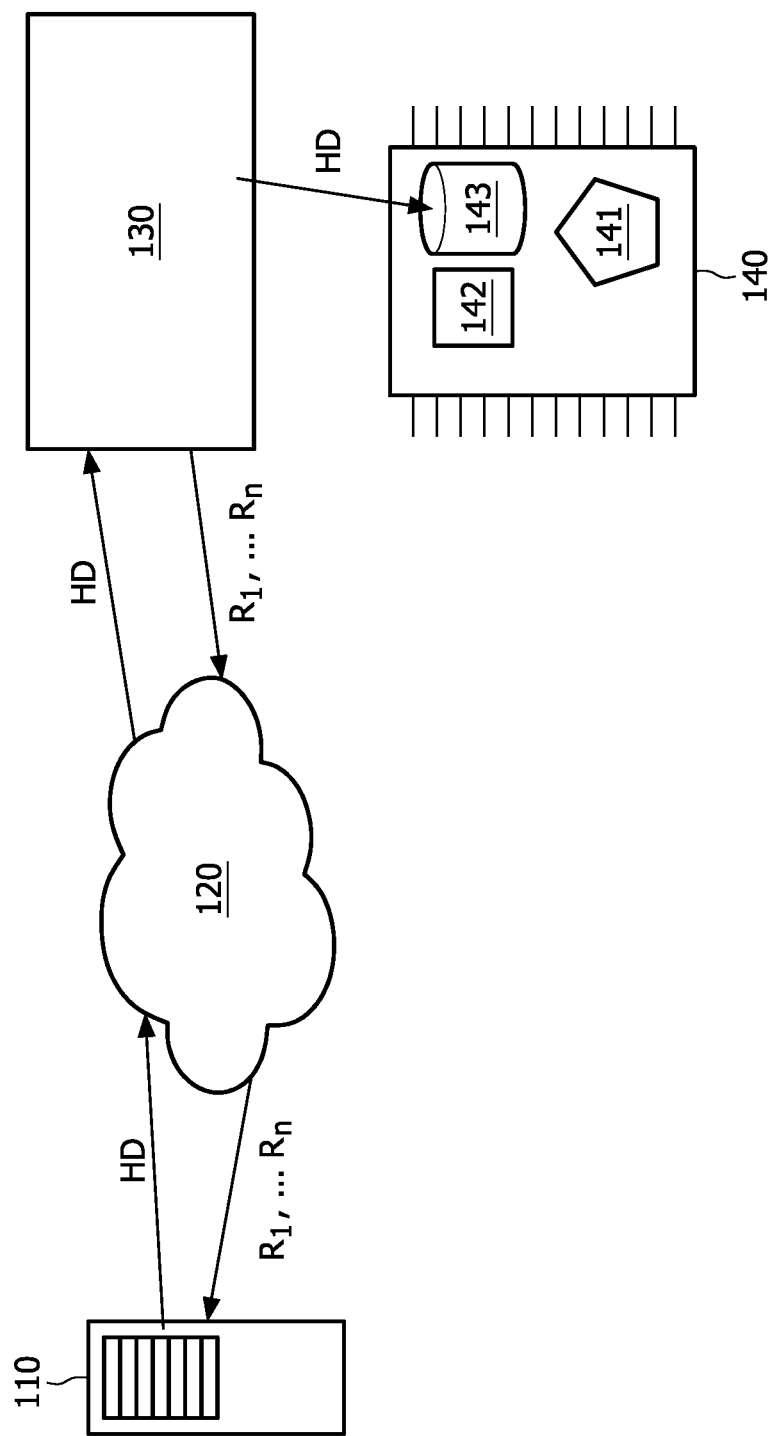
FIG. 1 schematically shows a system for controlled activation of at least one function in a product or component at a remote location.

FIG. 1 schematically shows a system 110 for controlled activation of at least one function 142 in a product or component 140 at a remote location 130. The activation of product or component 140, here a microchip, requires a correct activation data item to be available in the product or component 140. The product or component 140 here is a microchip, but it can equally well be any kind of product or component. Some examples are mobile phones, computers, laptops, watches, sensors, machines, airplanes, circuit boards and even computer software. The only requirement for the present invention is that the product or component 140 has a function that needs to be activated in a controlled manner.

The remote location 130 will typically be a manufacturing plant or factory where the product or component is assembled or produced. The term "remote" in this context is to be understood as indicating that the system 110 and the location 130 are not one and the same. In one embodiment the plant or factory is situated in the People's Republic of China and the system 110 is situated in the Kingdom of the Netherlands. In another embodiment the system 110 is implemented as a black box to be installed somewhere on the premises of the plant or factory.

To enable the activation, the product or component 140 is provided with an unclonable element 141. In the embodiment of FIG. 1, the unclonable element 141 is part of the microchip 140, but it may equally well be provided elsewhere in the product or component. For example the unclonable element 141 can be provided on the motherboard of a computer or laptop, and be provided for the activation of one particular chip also present in that computer.

The unclonable element 141 is challenged to produce one or more noisy outputs, denoted as $R_1, \ldots, R_n$ in FIG. 1. The output(s) are provided to the system 110, in this embodiment by transmitting them over a communications network 120 such as the Internet. Of course a phone line or any other means of communication can equally well be used.

The system 110 computes helper data HD based on the noisy outputs it receives, and provides this helper data HD back to the remote location 130. At the remote location 130, the helper data HD is made available to the product or component 140, for example by storing it in a memory 143 of the microchip.

The helper data transforms the one or more noisy outputs to a single value which should correspond to the correct activation data item. If the correct activation data item is indeed obtained, the functionality can be enabled. There are many ways in which this may be realized.

As mentioned above, activation in one embodiment is implemented by comparing the single value with a predefined code available to the IP block. If the two do not match, the function is not enabled.

If product or component 140 is a software program or bitstream for an FPGA, the single value can also be used as a key to unlock or decrypt all or part of the product or component 140.

The single value can also indicate a plurality of functions to be enabled or disabled. This may be realized by treating the single value as a sequence of indicators, each indicating for a particular function whether it is to be enabled or not. An easy way to realize this is to use a bitmask. For example, the eight-bit bitmask 00101101 indicates that the first two, the fourth and seventh functions are disabled and that the third, fifth, sixth and eighth functions are enabled.

The single value can also be used as a key necessary to process input provided to the product or component 140, for example as a decryption key for audiovisual content to be decrypted or to authenticate the product or component 140 at a remote server (not shown) with which data is to be exchanged.

Exactly which function is (or which functions are) activated and how is peripheral to the invention. The principles of the invention as claimed can be applied to enable or activate any functionality in any kind of device. However, for the purpose of illustration of the invention the following examples are provided:

Enabling use of a high-performance audio and/or video encoding or decoding chip or software program.

Enabling communication over a wireless network such as 802.11g.

Disabling an artificial limitation in the product's functionality, such as a time limitation or a limitation on the amount of data that may be transmitted per time unit.

Permitting the downloading of upgrades or updates to the product or its functionality.

Enabling communication over secure links such as HDTV that uses the HDMI copy protection protocol; activation here occurs by acquiring the right authentication key.

Enabling the functionality of an ASIC, FPGA or similar circuit, e.g. by enabling use of encrypted device keys with the device for decrypting audio-visual content.

Enabling a pay-per use model where the client only pays for the functionality he chooses. Each function can be individually enabled, and the authorization code for each function is purchased separately.

The unclonable element 141 is known by itself. One name for such components is Physical Random (Unclonable) Functions or PUFs. A PUF is a complex physical element comprising many randomly distributed components. When probed with suitable challenges, the complex physics governing the interaction between the physical element and the challenge, e.g. multiple scattering waves in a disordered medium, leads to a different random-looking output, or response, for each separate challenge.

The responses received from the token are susceptible to noise and perturbations, causing differences in responses each time a single challenge is presented to the PUF. A helper data item provides redundancy to transform these multiple, noisy response to a single value. The complex small-scale structure of the physical token makes it hard to produce a physical copy.

In addition to the literature already mentioned, examples of PUFs are disclosed in 1. R. Pappu, B. Recht, J. Taylor, N. Gershenfeld, "Physical One-Way Functions", Science vol 297, pp. 2026, (2002)
2. P. Tuyls, B. Skoric, S. Stalling a, A. H. Akkermans, W. Ophey, "Information-Theoretic Security Analysis of Physical Unclonable Functions", Financial Cryptography FC '05, LNCS 3570, Springer-Verlag pp. 141 (2005)
3. B. Skoric, P. Tuyls W. Ophey, "Robust key extraction from Physical Unclonable Functions", Applied Cryptography and Network Security ACNS 2005, LNCS 3531, pp. 407-422 (2005)
4. P. Tuyls, B. Skoric, G. J. Schrijen, R. Wolters, J. van Geloven, N. Verhaegh, H. Kretschmann, "Read-proof hardware from protective coatings", CHES 2006 to appear (2006)
5. B. Gassend, D. Clarke, M. van Dijk, S. Devadas, "Silicon Physical Random Functions", 9th ACM Conf. on Computer and Communications Security (2002)
6. P. Tuyls, B. Skoric, "Secret Key Generation from Classical Physics", Book Chapter, Hardware Technology Drivers for Ambient Intelligence, Kluwer (2005)

Several physical systems are currently known on which PUFs can be based. The main types are optical PUFs (see reference 1), coating PUFs (reference 4), silicon PUFs (reference 5) and acoustic PUFs (reference 6). In fact any physical system with the following properties can be used as a PUF if it has the following properties:

Cheap and easy to manufacture and involves random uncontrollable manufacturing process variations.
Impractical to characterize and model
Large input/output space Although this invention is applicable to all types of PUF, as an example consider the specific example of the optical PUF as a concrete example of the concepts described here. Optical PUFs consist of a transport material consisting of randomly distributed scattering particles. The randomness here is provided by the uniqueness and unpredictability of speckle patterns that result from multiple scattering of laser light in a distorted optical medium (reference 2). For a fixed wavelength of incident light, the input is the angle of incidence, focal distance, mask pattern or any other reproducible change in the wave front. The output is the resulting speckle pattern. Even given all of the precise details of the scatters it is extremely difficult to recover a particular speckle pattern. For more information on PUFs and the construction of helper data to stabilize PUF responses the reader is referred to the literature cited above.

To prevent an attacker at the remote location 130, for example the manufacturer operating a factory, from accessing the one or more noisy outputs and/or helper data, either or both could be encrypted using a key or algorithm unknown to this attacker. For example the product or component 140 may apply a simple XOR-based encryption to the one or more noisy outputs using a fixed key. In more complex arrangements the product or component 140 and the system 110 may set up a secure authenticated channel to securely exchange the one or more noisy outputs and/or the helper data.

A preferred embodiment is to have the system 110 produce an authentication element for the helper data, for example by creating a digital signature or message authentication code for the helper data using a secret key known to the system 110. Depending on the authentication algorithm or technology used, the authentication element can be transmitted together with or instead of the plain helper data. For example when generating a digital signature using an algorithm like RSA, the digital signature can be used instead of the helper data itself as the helper data is recovered when the digital signature is successfully verified.

The product or component 140 in this embodiment is configured to only employ the helper data if the authenticity of the helper data can be verified using this authentication element. When using public/secret key cryptographic digital signatures, the product or component 140 stores a public key corresponding to the abovementioned secret key to enable such verification. Public/secret key cryptography and digital signature verification is well-known and so will not be elaborated upon further.

This prevents the delivery of helper data by unauthorized parties. Even if some third party manages to determine how to produce particular helper data to enable particular functionality, he cannot create the right authentication element and so will be unable to activate the functionality.

Figure 2:
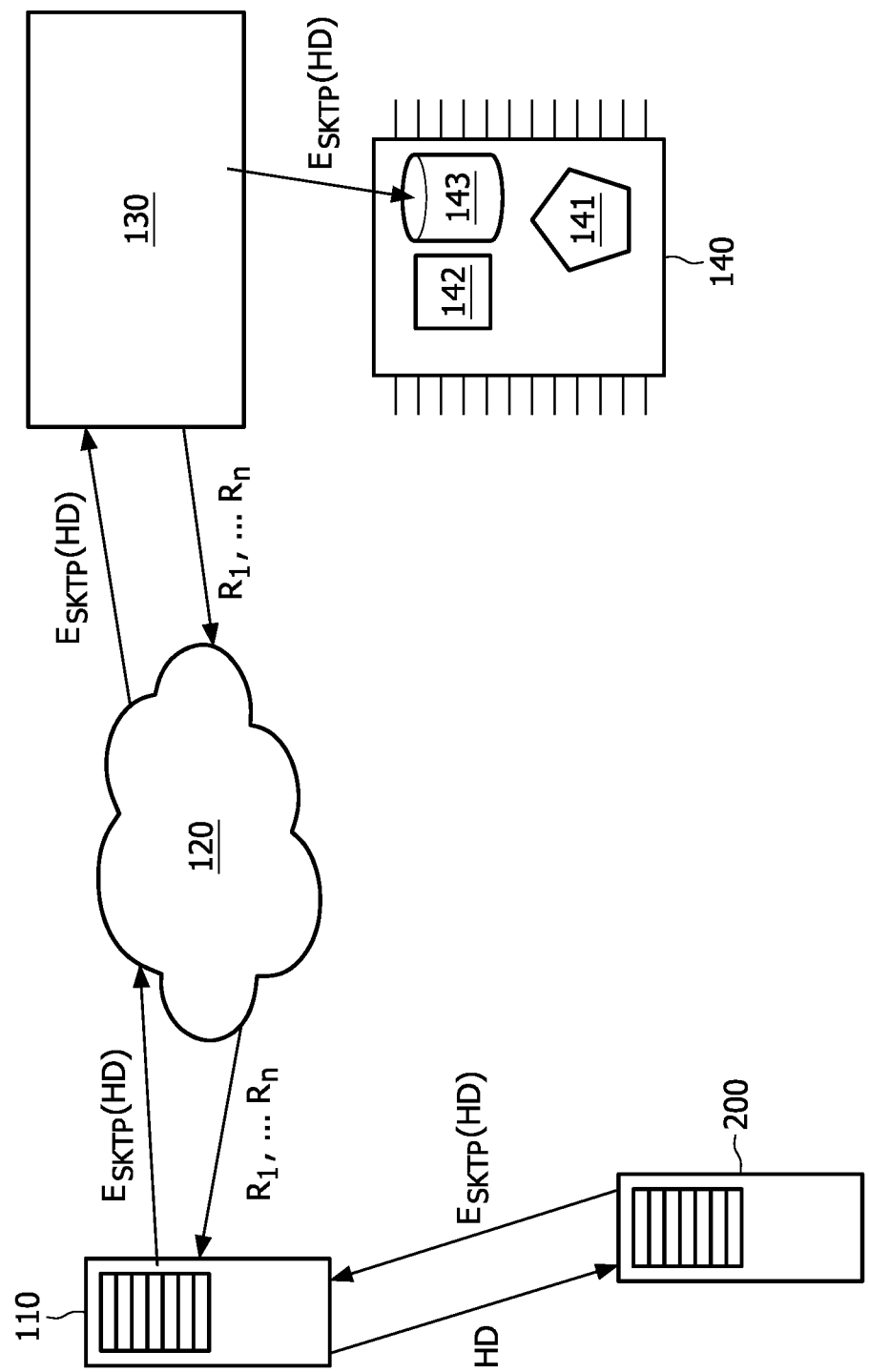
FIG. 2 schematically shows a first embodiment of this system.

FIG. 2 shows a further embodiment of the system 110 in which a third party 200 is introduced. The third party 200 provides an authentication element to the system 110, which authentication element is used for establishing authenticity of the helper data. The system 110 in turn passes on the authentication element to the remote location.

A preferred embodiment is to have the third party 200 produce a digital signature or encryption for the helper data by encrypting the helper data with a secret key known to the third party. This is shown in FIG. 2 by $E_{SKTP}(HD)$, shorthand for encryption with the Secret Key of the Third Party of the Helper Data.

Depending on the digital signature algorithm or technology used, the authentication element can be transmitted together with or instead of the plain helper data.

The product or component 140 in this embodiment is configured to only employ the helper data if the authenticity of the helper data can be verified using this authentication element. In the preferred embodiment mentioned previously, the product or component 140 stores a public key corresponding to the abovementioned secret key to enable such verification.

Figure 3:
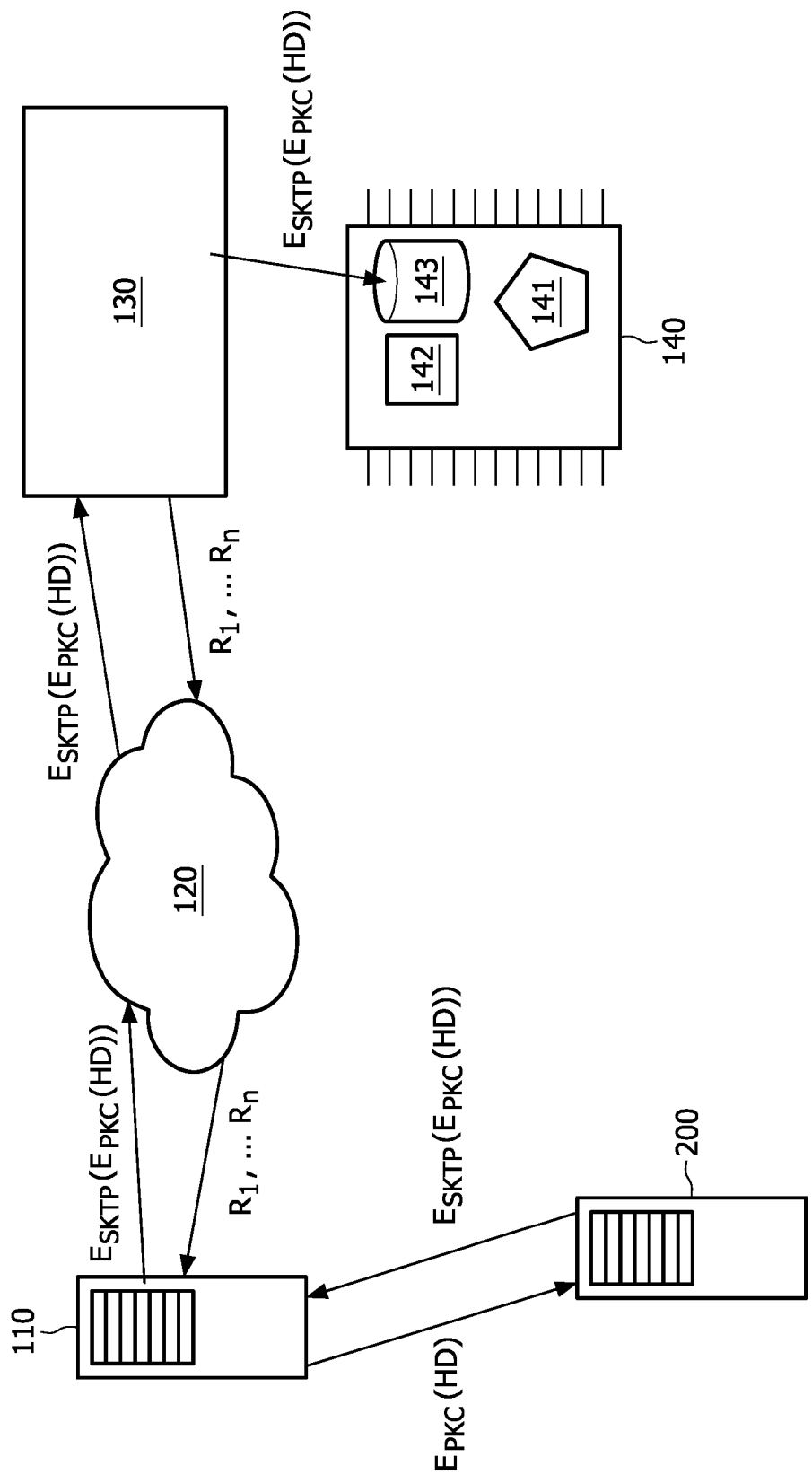
FIG. 3 schematically shows a second embodiment of this system.

FIG. 3 shows a further embodiment of the system 110 in which the helper data is encrypted before transmitting it to the third party. The helper data may be encrypted using symmetric or asymmetric cryptography. This prevents the third party from observing the actual helper data. This is shown by $E_{PKC}(HD)$, shorthand for encryption with a Public Key of the Component. The third party 200 produces a digital signature for this encrypted helper data: $E_{SKTP}(E_{PKC}(HD))$.

The product or component 140 now stores a secret key corresponding to the abovementioned public key PKC, for example in memory 143. The product or component 140 in this embodiment is configured to only employ the helper data if (1) the authentication element $E_{PKC}(HD)$ can be successfully decrypted using the abovementioned secret key and (2) the authenticity of the helper data HD can be verified using this authentication element.

Figure 4:
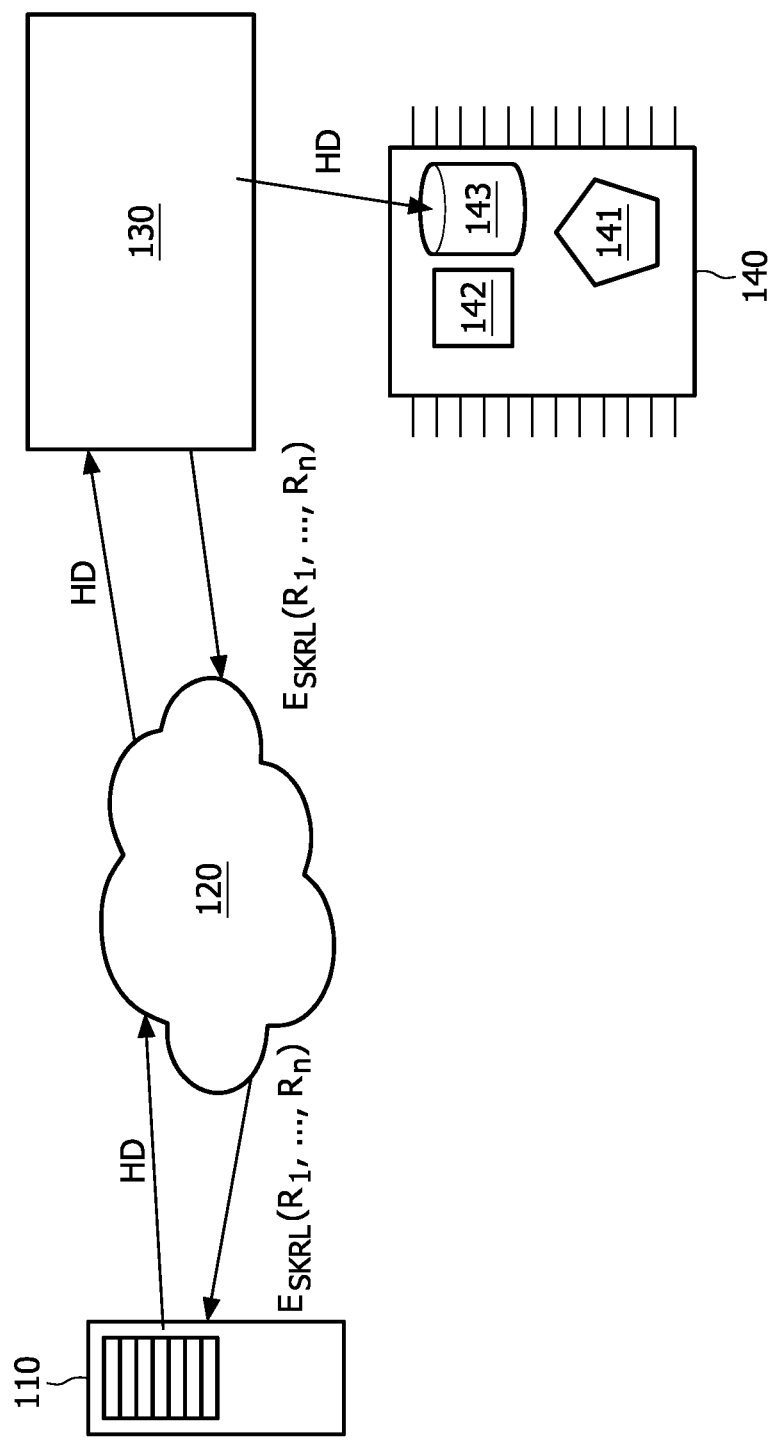
FIG. 4 schematically shows a third embodiment of this system.

FIG. 4 shows a further embodiment of the system 110 in which the remote location 130 includes a remote authentication element. The system 110 now only provides the helper data if the helper data can be successfully authenticated using the remote authentication element. Preferably a digital signature for the responses is produced using a secret key known to either the remote location 130 or the product or component

140. This is shown in FIG. 4 by $E_{SKRL}(R_1, \ldots, R_n)$, shorthand for encryption with the Secret Key of the Remote Location of the Responses.

In another embodiment (not shown) the received one or more noisy outputs $R_1, \ldots, R_n$ are compared against plural previously received noisy outputs, and the helper data is provided only if the one or more noisy outputs have not been received previously. The system 110 in this embodiment can be provided with a database for storing the received noisy outputs. A shortened representation (e.g. a hashed version) of the noisy outputs can be stored instead of the noisy outputs themselves to reduce the storage requirements. For example a hash function may be applied to the noisy outputs and the output of this function can be stored. Matching hashes is much more efficient and still enables determining if the exact same noisy responses have been received before.

It should be noted that the above-mentioned embodiments illustrate rather than limit the invention, and that those skilled in the art will be able to design many alternative embodiments without departing from the scope of the appended claims. For example, the embodiments of FIGS. 2, 3 and/or 4 can be combined to advantageously combine the benefits of any or all of them together. As another example, the helper data may be transmitted to a second remote location different from the remote location from which the one or more responses have been received.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of controlled activation of at least one function in a product or component at a remote location, which activation requires a correct activation data item to be available in the product or component, the method comprising:
    providing at the remote location a product or component, the product or component being configured to require a correct pre-determined activation data item to be available in the product or component to activate at least one function,
    receiving from the remote location, after the providing at the remote location the product or component, data based on one or more noisy outputs of an unclonable element at the remote location and associated with the product or component,
    computing helper data based on the received data based on the one or more noisy outputs such that applying the helper data to the one or more noisy outputs transforms the one or more noisy outputs to a single value which corresponds to the correct activation data item, and
    providing the helper data to the remote location for transforming the one or more noisy outputs to a single value which corresponds to the correct activation data item.

2. The method of claim 1, further comprising transmitting an authentication element for establishing authenticity of the helper data to the remote location.

3. The method of claim 2, in which the authentication element is obtained by transmitting the helper data to a third party and receiving the authentication element in response from the third party.

4. The method of claim 3, in which the helper data is encrypted before transmitting it to the third party.

5. The method of claim 1, further comprising receiving a remote authentication element from the remote location, and only providing the helper data if the data based on one or more noisy outputs can be successfully authenticated using the remote authentication element.

6. The method of claim 1, in which the helper data is transmitted to a second remote location different from the remote location from which the one or more responses have been received.

7. The method of claim 1, in which the received data based on the one or more noisy outputs are compared against plural previously received data based on noisy outputs, and the helper data is provided only if the data based on the one or more noisy outputs have not been received previously.

8. The method of claim 1, wherein the single value is used as a decryption key or authentication key.

9. The method of claim 1, wherein the single value is used as a key to unlock or decrypt all or part of the product or component.

10. The method of claim 1, wherein the product or component is a software program or bitstream for an FPGA.

11. A system for controlled activation of at least one function in a product or component at a remote location, which activation requires a correct activation data item to be available in the product or component, the system comprising:
    a receiver for receiving from a product or component at the remote location data based on one or more noisy outputs of an unclonable element at the remote location and associated with the product or component, the product or component being configured to require a correct pre-determined activation data item to be available in the product or component to activate at least one function, and
    a computer for computing helper data based on the data based on the one or more noisy outputs received such that applying the helper data to the one or more noisy outputs transforms the one or more noisy outputs to a single value which corresponds to the correct activation data item, and
    a transmitter for transmitting the helper data to the remote location for transforming the one or more noisy outputs to a single value which corresponds to the correct activation data item.

12. The system of claim 11, wherein the receiver is configured for receiving the data based on the one or more noisy outputs transmitted over a communications network.

13. The system of claim 12, wherein the communications network is the Internet.

14. The method of claim 1, further comprising comparing the single value with a predefined code available at the remote location, and wherein if the single value and the predefined code do not match, the function is not activated.

15. The system of claim 11 further comprising a third party that provides an authentication element to the system, the authentication element being used for establishing authenticity of the helper data.

16. The system of claim 15, wherein the authentication element is passed by the system on to the remote location.

17. The system of claim 15, wherein the third party encrypts the helper data using a secret key known to the third party.

18. The system of claim 15, wherein the helper data is encrypted by the system before transmitting it to the third party so that the third party is prevented from observing the helper data.

19. The system of claim 18, wherein the helper data is encrypted using symmetric or asymmetric cryptography.

20. The method of claim 7, wherein said comparison is a lossy comparison, wherein the received data is regarded as having been received previously if the received data differs less than a pre-determined amount from a previously received data.

21. The system as in claim 11, wherein the receiver is arranged to set-up a secure authenticated channel between the product or component and the system to securely exchange at least one of the one or more noisy outputs and the helper data.

22. A method as in claim 1, further comprising
transforming at the remote location the one or more noisy outputs to a single value,
activating at the remote location of the at least one function in the product or component at the remote location if the single value corresponds to the correct activation data item.

23. A method of selectively enabling or disabling activation of a plurality of functions in a product or component at a remote location, which activation requires a correct activation data item to be available in the product or component, the method comprising:

providing at the remote location a product or component, the product or component being configured to require a correct pre-determined activation data item to be available in the product or component to activate at least one function, receiving data based on one or more noisy outputs of an unclonable element associated with the product or component, computing helper data based on the received data based on the one or more noisy outputs such that applying the helper data to the one or more noisy outputs transforms the one or more noisy outputs to a single value which corresponds to the correct activation data item, the single value being a sequence of indicators, each indicator indicating for a particular function of the plurality of functions whether the particular function is to be enabled or disabled, providing the helper data to the remote location for transforming the one or more noisy outputs to a single value which corresponds to the correct activation data item, enabling, at the remote location, functions corresponding to indicators in the sequence of indicators indicating that the function is to be enabled, and disabling, at the remote location, functions corresponding to indicators in the sequence of indicators indicating that the function is to be disabled.

\* \* \* \* \*